No. 694,723. Patented Mar. 4, 1902.
C. F. BROOKS.
HARNESS SADDLE.
(Application filed Nov. 23, 1900.)
(No Model.)
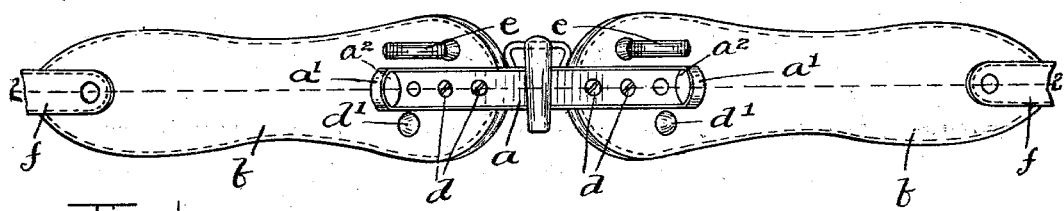
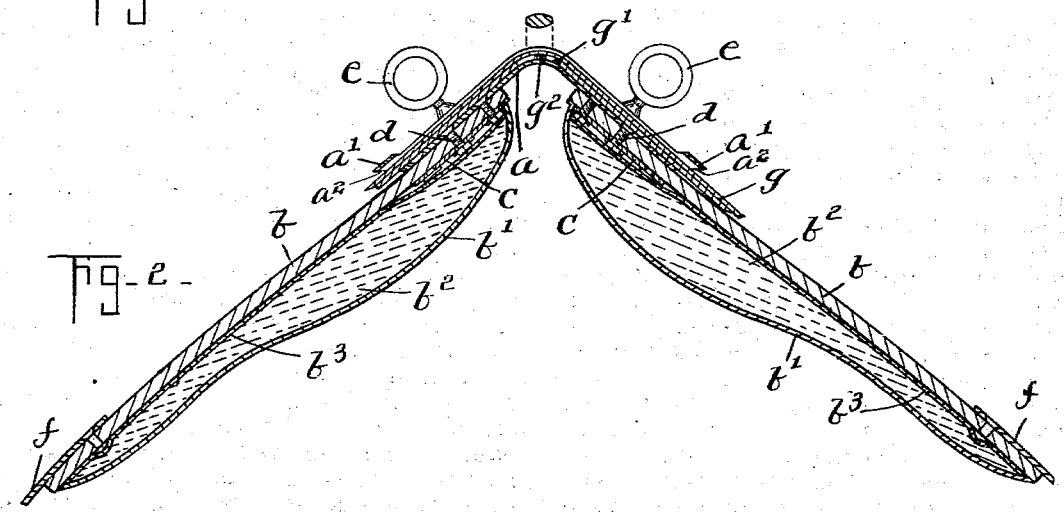
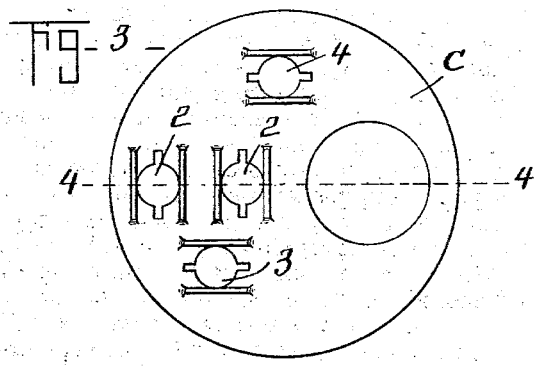
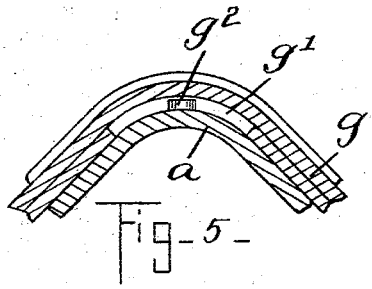
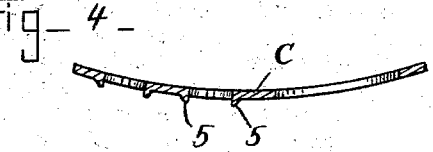
Witnesses:
H. B. Davis.
Albert B. Blackwood.
Inventor:
Charles F. Brooks
by B. J. Ayers
Atty.

UNITED STATES PATENT OFFICE.

CHARLES F. BROOKS, OF LYNN, MASSACHUSETTS.

HARNESS-SADDLE.

SPECIFICATION forming part of Letters Patent No. 694,723, dated March 4, 1902.

Application filed November 23, 1900. Serial No. 37,471. (No model.)

*To all whom it may concern:*

Be it known that I, CHARLES F. BROOKS, a citizen of the United States, residing in Lynn, county of Essex, State of Massachusetts, have invented an Improvement in Saddles, of which the following description, in connection with the accompanying drawings, is a specification, like letters on the drawings representing like parts.

This invention has for its object to improve the construction of saddles, to the end that a running back-band tree may be provided with a pair of skirts bearing saddle-pads having reinforcing-plates, and which skirts, pads, and plates are capable of being removed from the tree in assembled condition, and adjustment is also provided for said assembled skirts, pads, and plates up and down the tree, those on one side independently of those on the other, and that said assembled skirts, pads, and plates may be very securely connected to the tree.

In accordance with this invention the tree is adapted to receive a running back-band, and a pair of independent skirts bearing saddle-pads are attached to the under side of said tree. Each skirt is made of any suitable shape and size and has the saddle-pad attached to its under side. A reinforcing-plate is disposed contiguous the under side of the skirt, being placed between the skirt and pad. The reinforcing-plates, skirts, and tree have holes through them, through which bolts pass to attach the assembled skirts, pads, and plates to the tree, and said plates and skirts also have holes through them for the terrets, which are located at one side of the tree, and said plates and skirts also have holes through them for bolts which connect said plates and skirts together. The metallic tree is formed as a channeled bar having an integrally-formed strap at each end to thereby form or present a loop or eye through which the running back-band passes. The reinforcing-plate is made circular in shape and of a diameter approximately the width of the skirt, and it is curved more or less to thereby conform to the shape which it is desired to give to the upper end portion of the skirt, and said plate is or may be made of metal.

Figure 1 shows in plan view a saddle embodying this invention. Fig. 2 is a vertical section of the saddle shown in Fig. 1, taken on the dotted line 2 2. Fig. 3 is a plan view of the reinforcing-plate. Fig. 4 is a cross-section of said reinforcing-plate, taken on the dotted line 4 4. Fig. 5 is a detail showing in section the central portion of the tree and running back-band thereon.

$a$ represents the tree, which, as herein shown, is made of metal and is formed as a parallel-sided channeled bar having an integrally-formed strap $a'$ at each end to present a loop or eye $a^2$ for the running back-band. The tree is provided at each end with a number of holes for the attaching-bolts, said holes being arranged in a row. To the under side of the tree two independent skirts $b$ are attached, which may be made of any suitable shape and material, and to the under side of the skirt $b$ the saddle-pad is attached at its edges all around said skirt $b$. The saddle-pad comprises, essentially, the outside pieces $b'$ $b^3$ and upholstery $b^2$. A circular plate $c$ is provided, which is curved more or less, as represented in Fig. 4, and said plate is adapted to serve as a reinforcing-plate for the skirt, and said plate is therefore located contiguous the under side of said skirt $b$, which it is proposed to reinforce, as represented in Fig. 2, being placed between said skirt and the saddle-pad, and said plate is made of a diameter approximately the width of the skirt. The circular plate $c$, which is thus disposed on the under side of the skirt, is provided with a plurality of holes 2 2, which are disposed to register with corresponding holes in said skirt and also with the holes in the tree, and bolts $d$ pass through said holes in the tree, skirt, and plate to thereby attach the skirt to the tree. The skirts may be adjusted up and down the tree by using different holes in the tree. The circular plate $c$ has also a hole 3 opposite a corresponding hole in said skirt, and a bolt $d'$ passes through said holes to thereby assist in holding the reinforcing-plate $c$ in proper position relative to the skirt, this bolt being of particular importance when the assembled parts are removed from the tree. The circular plate $c$ has also a hole 4 through it opposite a corresponding hole in said skirt, and the terret $e$ passes through said holes. The terret $e$ is thus located in advance of or at one side of the tree and serves to attach the plate $c$ to the skirt. The circular plate $c$ is thus securely held in position with relation to the skirt, whether the skirt is attached to or removed from the tree, and it being disposed contiguous the under side of the skirt, which is made of leather and more or less flexible, serves to reinforce said skirt and also serves as a foundation-plate for assisting in attaching the skirt to the tree. The circular plate $c$ will be formed or provided with projections 5, adjacent the several holes, which act to prevent the nuts on the bolts from turning, and also act in conjunction with the yielding pad to hold the nuts in proper place when the bolts are withdrawn—as, for instance, when the assembled skirt, pad, and plate is removed from the tree. Straps $f$ will be attached to the skirts.

$g$ represents the running back-band, which is herein composed of two or more straps secured together, and the under strap is slotted at $g'$, and a stud $g^2$ projects up from the tree, which enters said slot and serves to limit the movement of said back-band in opposite ways.

It will be seen that by removing the bolts $d$ the skirts, plates, and pads may be removed from the tree in assembled condition and also may be adjusted independently up and down the tree.

I claim—

1. A saddle composed of a tree adapted to receive a running back-band and having holes through it, skirts having saddle-pads attached thereto, reinforcing-plates interposed between the skirts and saddle-pads, bolts passing through said plates and skirts, other bolts passing through said plates, skirts and tree, and terrets at one side of the tree passing through the skirts and plates, substantially as described.

2. The combination of a tree having a channel from end to end and loops or eyes $a^2$ and having the stud $g^2$ projecting from the inner bottom wall thereof, and a running back-band contained in said channel and passing through said loops or eyes and having a slot $g'$ for said stud $g^2$, substantially as described.

3. The combination with a tree provided with a channel and a stud therein, of a back-band running therein composed of two or more straps secured together, the under strap provided with an elongated slot adapted to receive the stud to limit the movement of the back-band, the upper strap being imperforate, substantially as described.

In testimony whereof I have signed my name to this specification in the presence of two subscribing witnesses.

CHARLES F. BROOKS.

Witnesses:
    B. J. NOYES,
    H. B. DAVIS.